(12) United States Patent
Gramme et al.

(10) Patent No.: US 7,803,233 B2
(45) Date of Patent: Sep. 28, 2010

(54) ARRANGEMENT FOR THE CLEANING OF A PIPE SEPARATOR

(75) Inventors: Per Eivind Gramme, Porsgrunn (NO); Gunnar Hannibal Lie, Porsgunn (NO)

(73) Assignee: Norsk Hydro ASA, Olso (NO)

( * ) Notice: Subject to any disclaimer, the term of this patent is extended or adjusted under 35 U.S.C. 154(b) by 341 days.

(21) Appl. No.: 11/886,150

(22) PCT Filed: Mar. 15, 2006

(86) PCT No.: PCT/NO2006/000096
§ 371 (c)(1),
(2), (4) Date: Oct. 23, 2007

(87) PCT Pub. No.: WO2006/098636
PCT Pub. Date: Sep. 21, 2006

(65) Prior Publication Data
US 2008/0178915 A1  Jul. 31, 2008

(30) Foreign Application Priority Data
Mar. 16, 2005  (NO) ................................. 20051388

(51) Int. Cl.
*B08B 9/02* (2006.01)
(52) U.S. Cl. ................................................. 134/169 C
(58) Field of Classification Search ............. 134/169 C
See application file for complete search history.

(56) References Cited
U.S. PATENT DOCUMENTS
4,030,708 A * 6/1977 Stock et al. ................. 366/142

(Continued)

FOREIGN PATENT DOCUMENTS
WO  99/35370  7/1999

(Continued)

OTHER PUBLICATIONS
International Search Report (in English language) issued Jun. 20, 2006 in PCT/NO2006/000096 of which the present application is the U.S. National Stage.

(Continued)

*Primary Examiner*—Michael Kornakov
*Assistant Examiner*—Samuel A Waldbaum
(74) *Attorney, Agent, or Firm*—Wenderoth, Lind & Ponack, L.L.P.

(57) ABSTRACT

A device or arrangement for cleaning a pipe separator (1) in which the separator body (2) includes an extended, tubular body with an inlet (4) and an outlet (5) having essentially the same diameter as the separator body. At the outlet, there is a bend or a loop (3) designed to maintain a fluid level in the separator. Just before the bend, there is an outlet (6) with an outlet pipe (9) for conducting fluid, e.g. water, from the separator. Sand or other particulate materials introduced into the outlet (6) are returned, using a pump (7) arranged on the outlet pipe (9), together with the fluid from the outlet, to the separator after the bend (3) by means of reversal with a valve (8) via a return pipe (11). In connection with the outlet (6), there is a flushing device having a pipe loop (12) connected to the outlet pipe (9) for the return of fluid from the outlet to the nozzles (14) arranged in the outlet. The nozzles are designed to flush, in a direction downstream of the outlet, any particles having accumulated in the outlet chamber.

13 Claims, 5 Drawing Sheets

U.S. PATENT DOCUMENTS 5,980,645 A 11/1999 Price
2002/0148607 A1* 10/2002 Pabst .................... 166/250.08

FOREIGN PATENT DOCUMENTS

WO 2004/016907 2/2004

OTHER PUBLICATIONS

Patent Cooperation Treaty (PCT) International Preliminary Report on Patentability, issued Apr. 4, 2007, in International Application No. PCT/NO2006/000096.

* cited by examiner

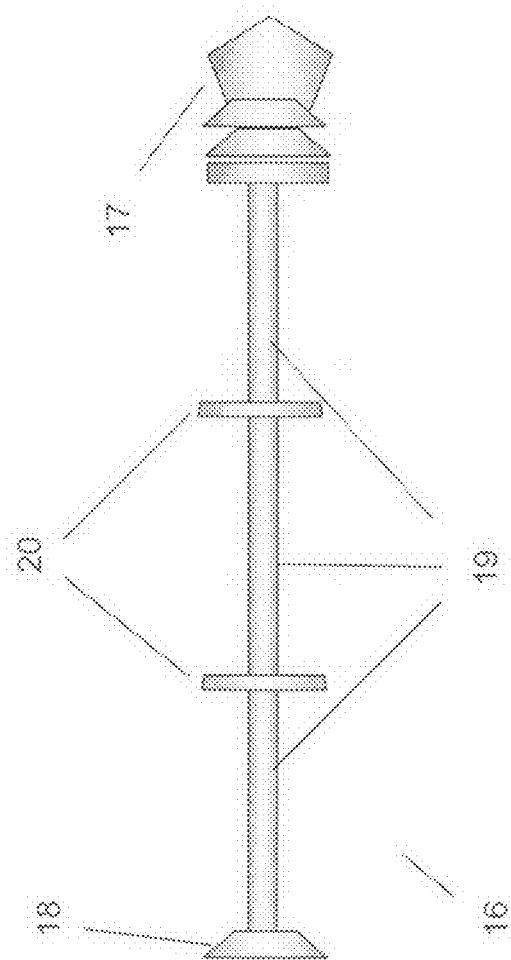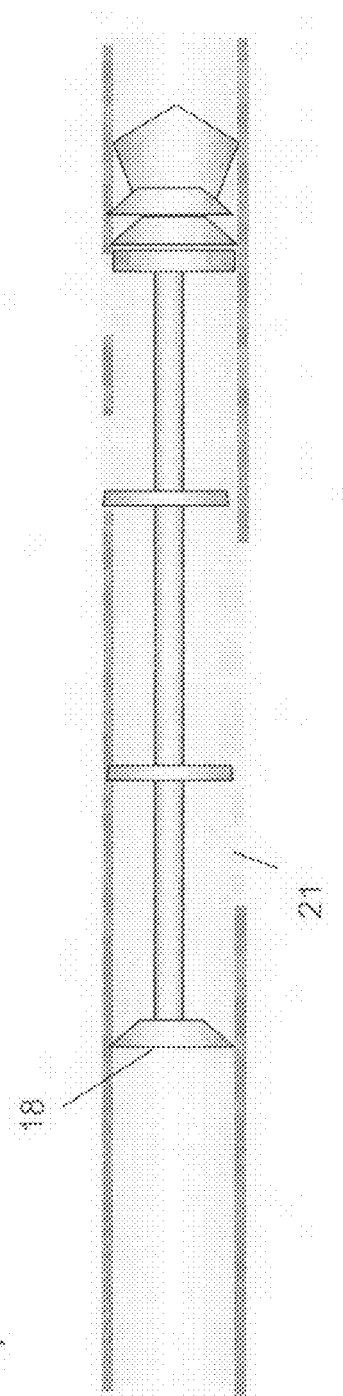
Fig 2

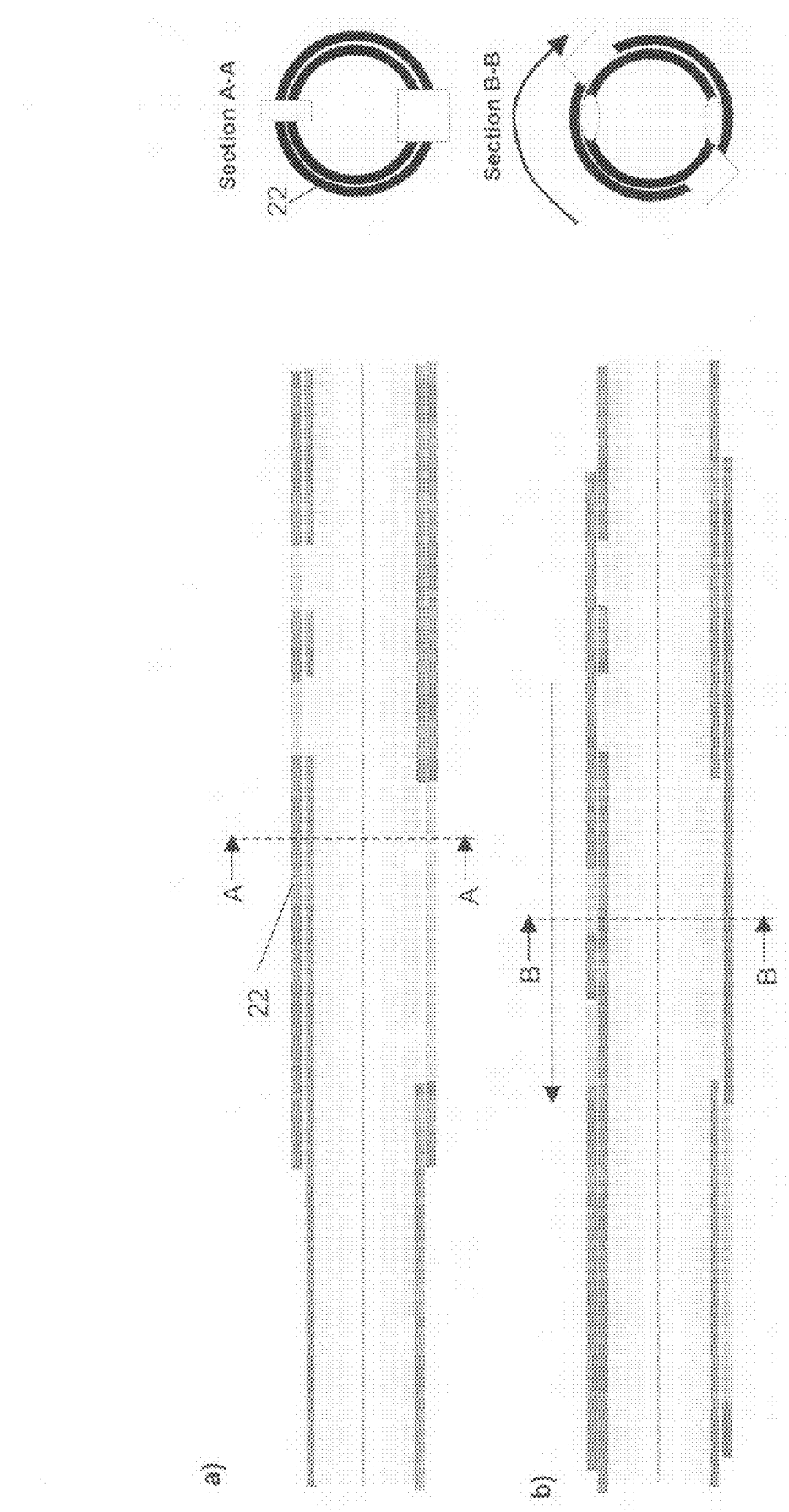

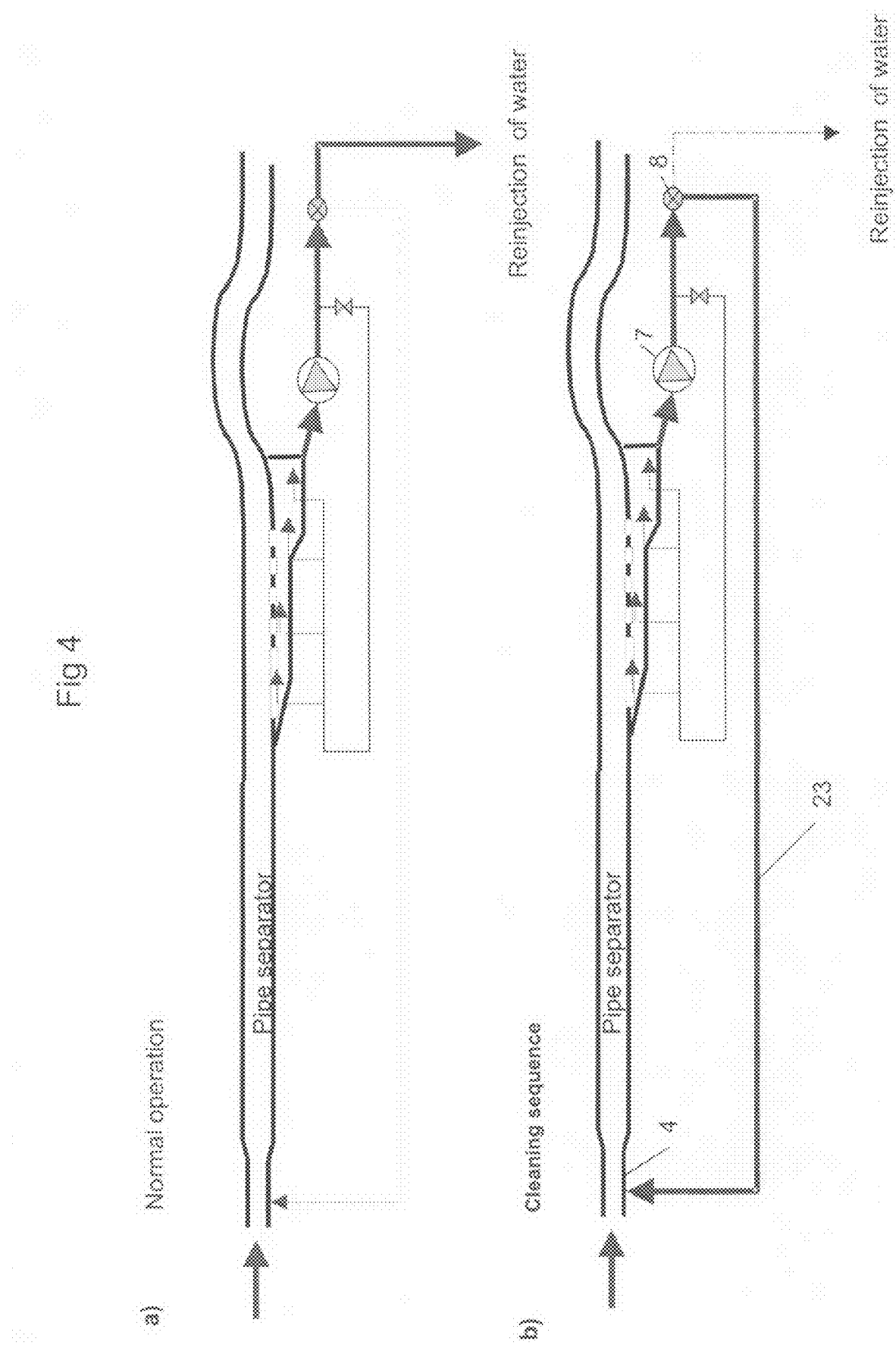

Fig 5

Particle Transport in Pipe separator

| Sand particle size (µm) | Superficial liquid velocity, VL (m/s) | Mode of sand transport | Hold-up of sand (-) | Height of stationary sand bed (m) |
|---|---|---|---|---|
| 40 | >0.5 | E | 0 | 0 |
| 40 | 0.5 | E | 0 | 0 |
| 40 | 0.45 | M | 0 | 0 |
| 40 | 0.4 | M | 0 | 0 |
| 40 | 0.35 | S | 0.017 | 0.0257 |
| 40 | 0.3 | S | 0.149 | 0.111 |
| 30 | >0.45 | E | 0 | 0 |
| 30 | 0.45 | E | 0 | 0 |
| 30 | 0.4 | M | 0 | 0 |
| 30 | 0.35 | M | 0 | 0 |
| 30 | 0.3 | S | 0.112 | 0.081 |
| 20 | >0.4 | E | 0 | 0 |
| 20 | 0.4 | E | 0 | 0 |
| 20 | 0.35 | M | 0 | 0 |
| 20 | 0.3 | M | 0 | 0 |
| 20 | 0.25 | S | 0.042 | 0.0467 |
| 15 | >0.4 | E | 0 | 0 |
| 15 | 0.4 | E | 0 | 0 |
| 15 | 0.35 | M | 0 | 0 |
| 15 | 0.3 | M | 0 | 0 |
| 15 | 0.25 | S | 0.149 | 0.111 |

Ref. data:
Sand density: 2565 kg/m³
Pipe diameter: 0.54 m
Pipe inclination: 0 deg
Pipe wall roughness: 2.50E-05

24″ schedule 80

Abbreviations:
E: All particles are entrained
M: Moving sand dunes or scouring particles
S: Stationary sand bed

ARRANGEMENT FOR THE CLEANING OF A PIPE SEPARATOR

BACKGROUND OF THE INVENTION

1. Technical Field of the Invention

The present invention concerns a device or an arrangement for cleaning a pipe separator in which the separator body consists of an extended, tubular body with an inlet at one end and an outlet at the other end. The inlet and the outlet have essentially the same diameter as the separator body and, at the outlet, there is a bend or a loop that is designed to maintain a fluid level in the separator, and, just ahead of the bend, an outlet for fluid, for example water, from the separator.

2. Description of the Related Art

Separators of this kind are previously known from the prior art, including the applicant's own international patent application, PCT/NO 03/00265. However, the patent application in question contains no solutions for how the separator is to be cleaned.

In particular in connection with the production of oil and gas, large or small quantities of sand and deposits will be produced, depending on the composition of the subterranean formation, which must be removed. In a separator of the above type that is used for the separation of water from the oil/gas produced, deposits may accumulate in places that a conventional reamer or pig cannot reach. This will apply, in particular, to the water outlet of the separator.

SUMMARY OF THE INVENTION

The present invention represents a solution for the cleaning of a separator of the above type that is simple and functional and that is inexpensive to produce and use.

The present invention is characterized in that sand particles or other particulate materials that are introduced into the outlet before the bend are designed to be returned to the separator after the bend by means of reversal with a valve via a return pipe

BRIEF DESCRIPTION OF THE INVENTION

The present invention will be described in further detail in the following using examples and with reference to the attached drawings, where:

FIG. 2 shows (a) a drawing of a pig or reamer in accordance with the present invention and (b) a drawing of part of the separator, shown in FIG. 1(a), over its outlet, with a pig or reamer, which is designed to be used to clean the separator in accordance with the present invention;

FIG. 3 shows a drawing of part of a separator with a sleeve for covering the opening for the water outlet in the separator; FIG. 3(a) shows an axially displaceable sleeve and FIG. 3(b) shows a rotating sleeve;

FIG. 4 shows (a) a drawing of a separator during operation, and (b) the same separator during cleaning; and FIG. 5 shows, in table form, the results of model calculations based on test results associated with particle transport (sand transport) in pipes, depending on the flow rate for different particle sizes.

DETAILED DESCRIPTION OF THE INVENTION

Figure 1:
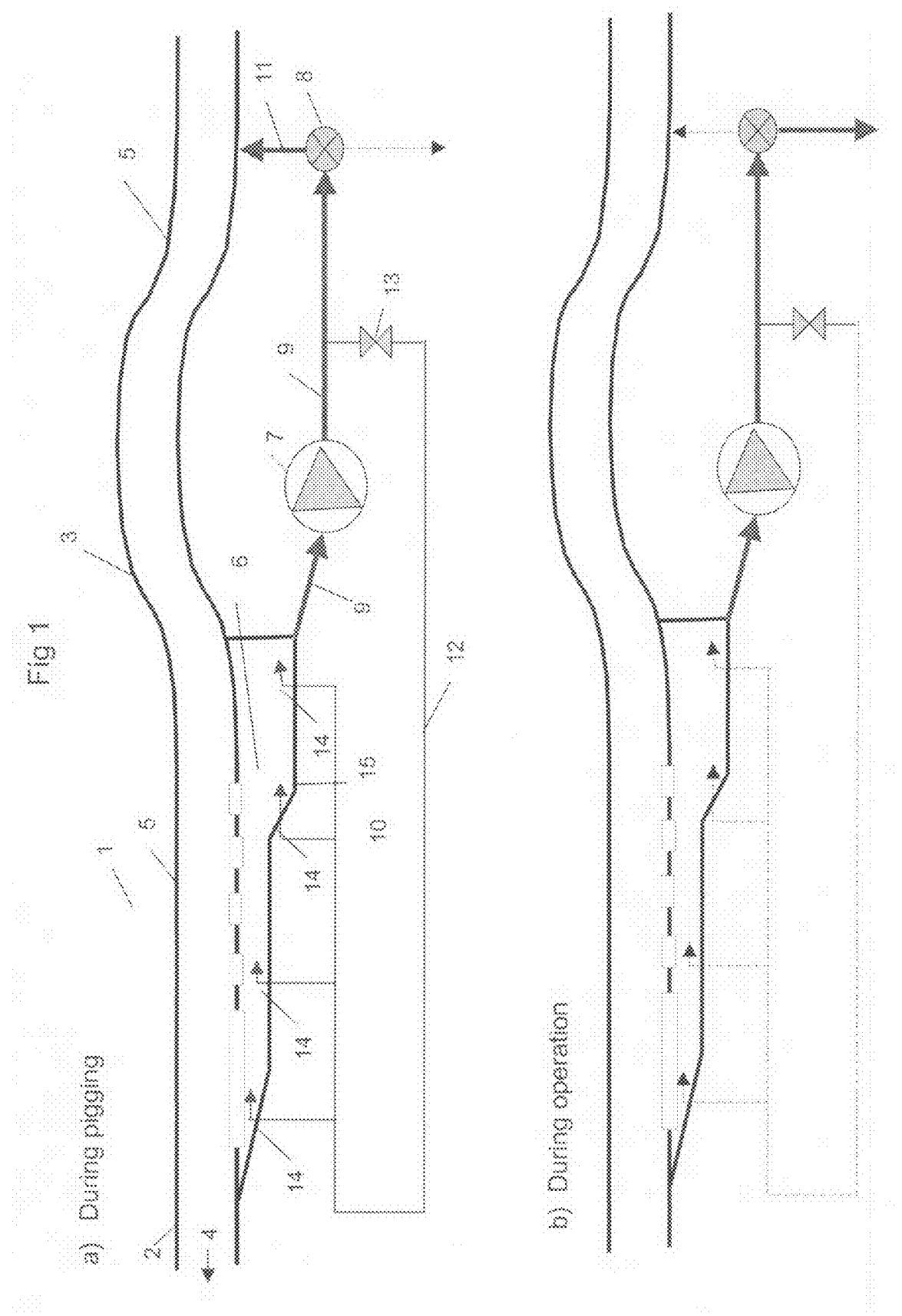
FIG. 1 shows a drawing of a separator with a flushing device in accordance with the present invention during reaming (a), and during operation (b)

FIG. 1(a) shows, as stated above, a drawing of a separator 1 for separation of a fluid, ideally oil/gas/water, in accordance with the present invention. It comprises a tubular body 2 (the entire length is not shown) with an inlet 4, an outlet 5, a bend 3 arranged in connection with the outlet and an outlet for water 6 arranged ahead of the bend 3. A pump 7 is arranged on the outlet pipe 9, downstream of the water outlet, to pump water that is separated from the separator on to a purification device (not shown) or for reinjection into an oil/gas reservoir, as shown in FIG. 1(b).

To prevent sludge and particles from being deposited in the water outlet, the water outlet is equipped with a flushing system 10, which comprises a reversing valve 8 arranged on the outlet pipe 9 and a reversing pipe 11 in connection with it, plus a return pipe 12 with a return valve 13 connected to the outlet pipe 9 ahead of the reversing valve 8. As shown in FIG. 1(a), the solution involves the water phase from the water outlet 6 with accumulated sludge/sand being reversible using the reversing valve 8 arranged on the outlet pipe 9, being fully or partially pumped, using the pump 7, back to the outlet pipe 5 after the separator via a reversing pipe 11, and being fully or partially returned, by opening the return valve, via the return pipe 12 to nozzles 14 in the water outlet 6, which are designed to flush sand and sludge located in the outlet chamber 15 downstream of the outlet towards the outlet pipe 9.

This flushing system can be in operation during the reaming operation, as shown and commented on in further detail in connection with FIG. 2 below, or, as required, in connection with the accumulation of sand or sludge at any time during the operation of the separator.

An appropriate electronic/electric control system is used to control the flushing system, i.e. to open and close the valves 8 and 13. This system will not be described here. Furthermore, to ensure that this water cannot cause a hydrate problem in the pipe downstream, hydrate inhibitor must be added to the pipe. This will not be described here either.

FIG. 2(a) shows a drawing of a pig or reamer 16, which is designed to be used to clean a separator in accordance with the present invention. It consists of an extended, flexible or articulated body, which will be able to pass through the water outlet part 6 (see FIG. 1) of a pipe separator without the outlet being covered and closed during the pigging operation. The reamer 16 consists of a standard reamer head 17 with a rear drive plate 18 connected to the reamer head via a flexible or articulated extended body 19, which, in turn, may be fitted, along the central part, with support plates or centring plates 20. Normally, the reamer will be driven by the fluid pressure that acts on the rear drive plate 18. This pressure will be maintained until the rear drive plate reaches the beginning of the opening 21 in the water outlet, as shown in FIG. 2(b). When the drive plate is located over the opening of the water outlet, the water outlet ducts will short-circuit the rear drive plate so that it could have stopped moving. At this point, the pig head has passed the water outlet and has full fluid pressure on its rear. This will move the pig on until the rear drive plate reaches the end of the water outlet. This will then take over the propulsion of the pig again. The aim of this solution is to design the reamer with sufficient length and with sealing for the reamer head so that the reamer can pass the water outlet without stopping.

The extended body is, as stated above, either flexible or articulated, but has sufficient support against the pipe wall via the support plates 20 to allow the reamer to pass through the fluid seal and any bent parts of the pipe separator.

The above solution with a long reamer is customized so that the reamer can pass through the opening 21 of the water outlet.

FIGS. 3(a) and (b) respectively show two alternative systems for covering the opening in the water outlet 6 to allow conventional reamers (which are normally too short in length) to be used to clean the pipe separator. The outlet 21 is covered here when the reamer passes the outlet to prevent the bypass of drive fluid. To cover the opening, it is possible to use either a rotating (FIG. 3(a)) or longitudinally displaceable (FIG. 3(b)) sleeve 22 that is driven by means of an actuator (not shown).

An alternative, simple method for cleaning a pipe separator is to increase the flow rate through the pipe separator for a short period at fixed intervals (for example 5 minutes every 24 hours). This method is shown in FIGS. 4(a) and (b) and is based on the same principle as that shown in FIG. 1. However, as shown in FIG. 4(b), there is also an alternative return pipe loop 23 from the reversing valve 8 and back to the inlet 4 of the separator. The water from the outlet passes, in this solution, from the pump 7 via the return pipe back to the separator inlet.

The flow rate must be increased to such an extent that the sand particles are redispersed and transported out of the pipe separator with the fluid phase (oil+water). It is important for hydrate inhibitor to be added to this water to prevent possible hydrate formation in the downstream outlet pipe from the separator.

FIG. 5 shows, in table form, the results of model calculations based on test results associated with particle transport (sand transport) in pipes, depending on the flow rate for different particle sizes. It is important for the flow rate (fluid speed) to reach the area in which the sand particles are dispersed in the fluid (i.e. E-entrained; see the middle column in FIG. 5).

If this method is used, the system must still be designed for reaming (pigging), but the intervals between pigging operations are considerably increased, for example to once a year.

The invention claimed is:

1. An apparatus comprising:
    a pipe separator having a separator body including a first end defining an inlet, a second end defining a terminal outlet, a bend or loop for maintaining a fluid level in the pipe separator, and a fluid outlet located upstream of the bend or loop the bend or loop being located at the terminal outlet of the pipe separator, wherein the separator body comprises an extended tubular body, and the separator body inlet and the separator body outlet have essentially the same diameter as the separator body;
    an outlet pipe connected to the fluid outlet for conducting fluid from the separator;
    a pump arranged on the outlet pipe;
    a reversing valve arranged on the outlet pipe;
    a return pipe connected to the reversing valve and communicating with the separator body at a location downstream of the bend or loop; and
    a flushing device comprising a plurality of nozzles arranged in the fluid outlet and a pipe loop connected to the outlet pipe, the flushing device being operable to return fluid from the fluid outlet to the nozzles to flush any particles accumulated in the outlet in a direction downstream of the outlet,
    wherein, by using the pump arranged on the outlet pipe, sand particles or other particulate materials that have accumulated at the fluid outlet upstream of the bend or loop can be returned together with fluid from the outlet to the separator body at a location downstream of the bend or loop via the reversing valve and the return pipe.

2. The apparatus in accordance with claim 1, further comprising a cover device in the form of a sleeve arranged in connection with the fluid outlet, wherein the cover device is rotatable or longitudinally displaceable to permit the fluid outlet to be covered while the separator is being reamed.

3. The apparatus in accordance with claim 1, further comprising a second return pipe connected to the reversing valve and connected to the separator body inlet so that fluid from the fluid outlet can be returned to the inlet of the separator body to increase the fluid flow in the separator.

4. The apparatus in accordance with claim 3, wherein the pipe loop and the second return pipe are arranged such that the flushing of the outlet and the increased flow through the separator can be performed alternately.

5. The apparatus in accordance with claim 1, further comprising a flexible, extended reamer for reaming the pipe separator.

6. A method of cleaning the apparatus of claim 1, further comprising allowing fluid to pass through the outlet pipe which is connected to the fluid outlet.

7. The method as claimed in claim 6, further comprising returning fluid from the fluid outlet to the nozzles.

8. The method as claimed in claim 7, further comprising flushing, in a direction downstream of the fluid outlet, any particles that have accumulated in the outlet.

9. The method as claimed in claim 6, further comprising covering the fluid outlet with a cover device, and then reaming the separator body with a flexible reamer.

10. The method as claimed in claim 6, further comprising returning fluid from the fluid outlet to the inlet of the separator body.

11. The method as claimed in claim 6, further comprising alternately flushing the fluid outlet and returning fluid from the outlet to the inlet of the separator body.

12. The method as claimed in claim 6, further comprising reaming the separator body.

13. The method as claimed in claim 12, wherein the separator body is reamed with a flexible and longitudinally extended reamer.

* * * * *